(12) United States Patent  
Darcy

(10) Patent No.: US 9,141,351 B2  
(45) Date of Patent: *Sep. 22, 2015

(54) INDICATORS FOR RESOURCES WITH IDEMPOTENT CLOSE METHODS IN SOFTWARE PROGRAMS

(75) Inventor: Joseph D. Darcy, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/461,621

(22) Filed: May 1, 2012

(65) Prior Publication Data

US 2013/0298106 A1    Nov. 7, 2013

(51) Int. Cl.
  *G06F 9/44* (2006.01)
  *G06F 9/45* (2006.01)

(52) U.S. Cl.
  CPC ............ *G06F 8/41* (2013.01); *G06F 2209/481* (2013.01)

(58) Field of Classification Search
  None
  See application file for complete search history.

(56) References Cited

U.S. PATENT DOCUMENTS

| | | | | |
|---|---|---|---|---|
| 6,247,139 | B1 * | 6/2001 | Walker et al. | 714/2 |
| 6,308,163 | B1 * | 10/2001 | Du et al. | 705/7.25 |
| 6,366,300 | B1 * | 4/2002 | Ohara et al. | 715/771 |
| 6,507,675 | B1 * | 1/2003 | Lee et al. | 382/266 |
| 6,981,104 | B2 * | 12/2005 | Prabhu | 711/144 |
| 7,483,390 | B2 * | 1/2009 | Rover et al. | 370/254 |
| 7,661,099 | B2 * | 2/2010 | Farchi et al. | 717/156 |
| 7,861,237 | B2 * | 12/2010 | Tarditi et al. | 717/151 |
| 8,099,538 | B2 * | 1/2012 | Saha et al. | 710/200 |
| 8,099,726 | B2 * | 1/2012 | Harris | 717/159 |
| 8,239,406 | B2 * | 8/2012 | Faunce et al. | 707/770 |
| 8,266,609 | B2 * | 9/2012 | Harris | 717/159 |
| 8,375,244 | B2 * | 2/2013 | Bobak et al. | 714/3 |
| 8,387,066 | B1 * | 2/2013 | Becher et al. | 718/106 |
| 8,407,386 | B2 * | 3/2013 | Saha et al. | 710/200 |
| 8,418,159 | B2 * | 4/2013 | Farchi et al. | 717/157 |
| 8,572,595 | B1 * | 10/2013 | Lethin et al. | 717/155 |
| 8,655,989 | B2 * | 2/2014 | Ritter et al. | 709/220 |
| 8,732,682 | B2 * | 5/2014 | Marathe et al. | 717/141 |
| 8,799,882 | B2 * | 8/2014 | Tarditi et al. | 717/151 |
| 2002/0059568 | A1 * | 5/2002 | Kawahito et al. | 717/151 |
| 2002/0129214 | A1 * | 9/2002 | Sarkar | 711/162 |
| 2003/0018961 | A1 * | 1/2003 | Ogasawara | 717/158 |
| 2004/0010663 | A1 * | 1/2004 | Prabhu | 711/143 |

(Continued)

OTHER PUBLICATIONS

Suman Saha et al., "Hector: Detecting Resource-Release Omission Faults in Error Handling Code for Systems Software", 2013, IEEE, (Whole Document).*

(Continued)

*Primary Examiner* — Don Wong
*Assistant Examiner* — Roberto E Luna
(74) *Attorney, Agent, or Firm* — Park, Vaughan, Fleming & Dowler LLP; Chia-Hsin Suen

(57) ABSTRACT

The disclosed embodiments provide a system that facilitates the development and compilation of a software program. During operation, the system provides, in a programming language platform associated with source code for the software program, an indicator for a resource with an idempotent close method. Next, the system enables use of the indicator with a resource-management statement in the source code, wherein the indicator facilitates the use of a wrapped resource in the resource-management statement.

23 Claims, 5 Drawing Sheets

(56) References Cited

U.S. PATENT DOCUMENTS

| | | | |
|---|---|---|---|
| 2004/0025084 A1* | 2/2004 | Krueger | 714/35 |
| 2004/0162871 A1* | 8/2004 | Pabla et al. | 709/201 |
| 2004/0187117 A1* | 9/2004 | Orion et al. | 718/100 |
| 2004/0267949 A1* | 12/2004 | Rover et al. | 709/230 |
| 2005/0091638 A1* | 4/2005 | Bley | 717/111 |
| 2005/0289548 A1* | 12/2005 | Farchi et al. | 718/101 |
| 2006/0074955 A1* | 4/2006 | Kuersch et al. | 707/101 |
| 2006/0161907 A1* | 7/2006 | Newport et al. | 717/151 |
| 2007/0016617 A1* | 1/2007 | Lomet | 707/200 |
| 2007/0100967 A1* | 5/2007 | Smith et al. | 709/219 |
| 2007/0142935 A1* | 6/2007 | Danielsson et al. | 700/29 |
| 2007/0169030 A1* | 7/2007 | Tarditi et al. | 717/140 |
| 2007/0169031 A1* | 7/2007 | Harris | 717/140 |
| 2008/0052697 A1* | 2/2008 | Stoodley et al. | 717/159 |
| 2008/0301077 A1* | 12/2008 | Fung et al. | 706/46 |
| 2009/0037885 A1* | 2/2009 | Edwards et al. | 717/128 |
| 2009/0049421 A1* | 2/2009 | Meijer et al. | 717/100 |
| 2009/0094301 A1* | 4/2009 | Joisha | 707/206 |
| 2009/0171733 A1* | 7/2009 | Bobak et al. | 705/8 |
| 2009/0177830 A1* | 7/2009 | Orion et al. | 710/267 |
| 2009/0276784 A1* | 11/2009 | Grieve et al. | 718/104 |
| 2009/0293046 A1* | 11/2009 | Cheriton | 717/136 |
| 2010/0011341 A1* | 1/2010 | Baierl et al. | 717/113 |
| 2010/0070558 A1* | 3/2010 | Miura et al. | 709/202 |
| 2010/0077398 A1* | 3/2010 | Farchi et al. | 718/101 |
| 2010/0083237 A1* | 4/2010 | Kneebone et al. | 717/128 |
| 2010/0131936 A1* | 5/2010 | Cheriton | 717/146 |
| 2010/0169381 A1* | 7/2010 | Faunce et al. | 707/797 |
| 2010/0185714 A1* | 7/2010 | Gerber et al. | 707/966 |
| 2011/0016178 A1* | 1/2011 | Palmieri | 709/204 |
| 2011/0022551 A1* | 1/2011 | Dixon | 706/12 |
| 2011/0029959 A1* | 2/2011 | Tackett | 717/131 |
| 2011/0107297 A1* | 5/2011 | Chandra et al. | 717/110 |
| 2011/0161924 A1* | 6/2011 | Alexander et al. | 717/109 |
| 2011/0276977 A1* | 11/2011 | van Velzen et al. | 718/104 |
| 2011/0321019 A1* | 12/2011 | Gibbons et al. | 717/140 |
| 2012/0042256 A1* | 2/2012 | Jamjoom et al. | 715/736 |
| 2012/0089760 A1* | 4/2012 | Saha et al. | 710/200 |
| 2012/0090021 A1* | 4/2012 | Luh et al. | 726/17 |
| 2012/0102488 A1* | 4/2012 | Wintergerst et al. | 718/1 |
| 2012/0226793 A1* | 9/2012 | Rover et al. | 709/223 |
| 2012/0284562 A1* | 11/2012 | Sankaralingam et al. | 714/16 |
| 2013/0047163 A1* | 2/2013 | Marathe et al. | 718/104 |
| 2013/0066955 A1* | 3/2013 | Neel et al. | 709/203 |
| 2013/0067133 A1* | 3/2013 | Mansell et al. | 710/267 |

OTHER PUBLICATIONS

Suman Saha et al., "Finding Resource-Release Omission Faults in Linux", 2011, ACM, (Whole Document).*

Suman Saha et al., "Improving Error-Handling Code in Systems Software", 2013, (Whole Document).*

* cited by examiner

INDICATORS FOR RESOURCES WITH IDEMPOTENT CLOSE METHODS IN SOFTWARE PROGRAMS

RELATED APPLICATION

The subject matter of this application is related to the subject matter in a co-pending non-provisional application by the same inventor as the instant application and filed on the same day as the instant application entitled "Indicators for Resources with Close Methods That Do Not Complete Erroneously in Software Programs," having U.S. Ser. No. 13/461,614, and filed on 1 May 2012.

BACKGROUND

1. Field

The present embodiments relate to exception handling in programming languages. More specifically, the present embodiments relate to indicators for resources with idempotent close methods to facilitate the execution of resource-management statements with wrapped resources in software programs.

2. Related Art

Programming language platforms may include resources that must be manually closed, such as file descriptors, formatters, sockets, input/output (I/O) channels, database connections, and/or graphics contexts. However, manual closing of resources is often performed incorrectly and/or increases code length and complexity. For example, a resource may be initialized and used within a "try-catch" block and closed within a "finally" block following the "try-catch" block. If the resource's close method can complete erroneously (e.g., complete abruptly with a checked exception), an exception-handling construct must be included. For example, the exception-handling construct may include a catch block for checked exceptions and/or a throws clause for checked exceptions on the enclosing method and/or constructor. Moreover, if the close method is not called (e.g., due to omission of a call to the close method and/or a thrown exception before a call to the close method is made), resource leaks and/or failures may occur.

To simplify use of such resources, the resources may be declared using resource-management statements that automatically close the resources after the resources are no longer used. For example, a resource-management statement may correspond to a form of a "try" block that declares one or more resources, with the scope of the resource declaration(s) limited to the "try" block. During compilation of the resource-management statement, a compiler may insert a "finally" block and/or a nested "try-catch" block containing calls to the resources' close methods after the resource-management statement. Finally, once the resource-management statement finishes executing (e.g., normally or abruptly), the inserted code is executed and the declared resources are automatically closed.

As a result, use of resource-management statements to initialize and close resources may streamline source code, simplify development, and/or reduce the incidence of resource leaks and/or failures.

SUMMARY

The disclosed embodiments provide a system that facilitates the development and compilation of a software program. During operation, the system provides, in a programming language platform associated with source code for the software program, an indicator for a resource with an idempotent close method. Next, the system enables use of the indicator with a resource-management statement in the source code, wherein the indicator facilitates the use of a wrapped resource in the resource-management statement.

In some embodiments, providing the indicator for the resource with the idempotent close method involves including the indicator in a type hierarchy of the programming language platform.

In some embodiments, providing the indicator for the resource with the idempotent close method further involves including the indicator in a set of types in the type hierarchy based on a set of close methods of the types.

In some embodiments, enabling use of the indicator with the resource-management statement in the source code involves permitting use of the wrapped resource in the resource-management statement if the wrapped resource corresponds to an implementation of a type associated with the indicator.

In some embodiments, the idempotent close method comprises a Boolean field associated with closing of the resource.

In some embodiments, if the Boolean field indicates that the resource has been closed, the close method returns without executing.

In some embodiments, the type is associated with at least one of an interface, an abstract class, an annotation, a modifier, and a naming convention.

BRIEF DESCRIPTION OF THE FIGURES

In the figures, like reference numerals refer to the same figure elements.

DETAILED DESCRIPTION

Figure 1:
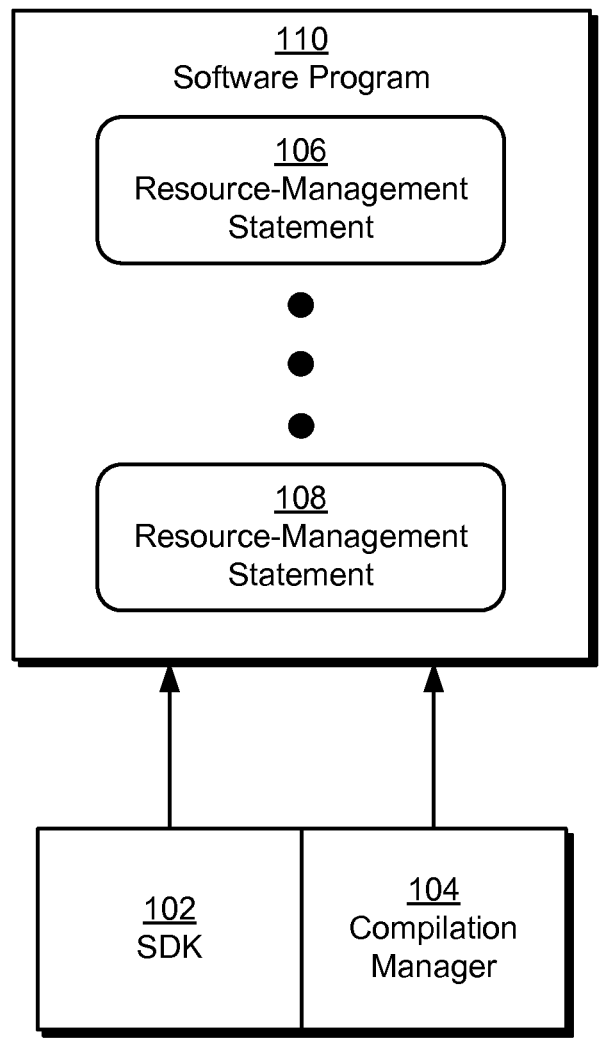
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and compilation of a software program. During development of the software program, source code for the software program may be created using a programming language. The source code may then be compiled into an executable form to enable the execution of the software program.

More specifically, the disclosed embodiments provide, in a programming language platform associated with the source code, indicators for resources that allow for faster and/or more concise handling of exceptional conditions, such as file descriptors, formatters, sockets, input/output (I/O) channels, database connections, and/or graphics contexts. These indicators may be included in a type hierarchy of the programming language platform and/or in a set of types in the type hierarchy based on the close methods of the types. For example, the indicators may be associated with interfaces, abstract classes, annotations, modifiers, and/or naming conventions in the programming language platform. One indicator may correspond to a resource with a close method that does not complete erroneously (e.g., complete abruptly with a checked exception), and another indicator may correspond to a resource with an idempotent close method.

Both indicators may additionally be used with resource-management statements in the source code. Each resource-management statement may be used to declare one or more resources. The resource(s) may then be initialized and used within the scope of the resource-management statement. Finally, the resource(s) may be automatically closed after the resource-management statement completes execution. The first indicator may thus facilitate the omission of an exception-handling construct (e.g., a catch block for checked exceptions and/or a throws clause for checked exceptions on the enclosing method and/or constructor) following the resource-management statement, while the second indicator may facilitate the use of a wrapped resource in the resource-management statement.

FIG. 1 shows a schematic of a system in accordance with an embodiment. As shown in FIG. 1, a software development kit (SDK) 102 and a compilation manager 104 may be used to manage the development and compilation of a software program 110. For example, SDK 102 and/or compilation manager 104 may form a part of the Java (Java™ is a registered trademark of Oracle America, Inc.) Development Kit (JDK).

Software program 110 may correspond to a standalone application, operating system, enterprise application, database, library, device driver, and/or other type of executable code. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, SDK 102 supports the creation of a set of resource-management statements 106-108 using source code for software program 110. Each resource-management statement 106-108 may be used to declare one or more resources that must be manually closed, such as file descriptors, formatters, sockets, input/output (I/O) channels, database connections, and/or graphics contexts. The scope of the resource(s) may also be limited to the resource-management statement. The resource-management statement may then be used to automatically close the resource(s) after the resources are no longer used.

For example, source code for a resource-management statement in a Java program may include the following:

```
try (BufferedReader br = new BufferedReader(
        new FileReader(path)) {
    ... // Use buffered reader
}
```

Within the example, the resource-management statement is represented by a "try" statement that declares two resources: a "BufferedReader" named "br" and a "FileReader" wrapped by the "BufferedReader." During compilation of the resource-management statement, compilation manager 104 may insert try-finally blocks containing calls to the close methods of "FileReader" and "BufferedReader" into the compiled form of software program 110. The inserted code may then be executed after the resource-management statement finishes executing, either normally or abruptly.

However, resource-management statements 106-108 may be associated with a number of problems. First, the use of a resource-management statement to declare a resource with a type that can complete erroneously (e.g., complete abruptly with a checked exception) may require the subsequent inclusion of an exception-handling construct for the resource-management statement, even if the resource's implementation does not complete erroneously. For example, the "java.lang.AutoCloseable" interface of the Java platform may include a close method that is declared to throw an "Exception," which corresponds to a checked exception that may close abruptly. As a result, a resource-management statement declaring a Java resource that implements the "AutoCloseable" interface may compile only if the resource-management statement is associated with an exception-handling construct, even if the close method of the Java resource does not complete erroneously (e.g., throw checked exceptions). Alternatively, the checked exception may be declared to be thrown in the method and/or constructor enclosing the resource-management statement and handled by the caller of the method and/or constructor, thus propagating overly broad exception behavior to outside the resource-management statement.

Second, the declaring of wrapped resources in resource-management statements may cause problems with the initialization and/or closing of the wrapped resources. Continuing with the exemplary source code for the resource-management statement above, a resource leak may occur if the "FileReader" is constructed but the subsequent "BufferedReader" construction fails (e.g., due to insufficient memory for the buffer). More specifically, the "BufferedReader" constructor may throw an exception before the resource-management statement is entered, thus precluding the closing of the "FileReader."

To circumvent potential resource leaks associated with wrapped resources, the resource-management statement may be rewritten using the following source code:

```
try (FileReader fr = new FileReader(path);
    BufferedReader br = new BufferedReader(fr)) {
    ... // Use buffered reader
}
```

In the source code, the "FileReader" and "BufferedReader" are treated as separate resources. As a result, the resource-management statement may ensure that the successful initialization of each resource results in the subsequent calling of the resource's close method. On the other hand, the wrapping of the "FileReader" by the "BufferedReader" may cause the close method of the "FileReader" to be called twice: first, when the closing of the "BufferedReader" is cascaded to the wrapped "FileReader," and again, when the close method of the "FileReader" is directly called by the resource-management statement. Such double calling of the "FileReader" close method may produce unwanted side effects if the close method is not idempotent.

In one or more embodiments, SDK 102 and compilation manager 104 include functionality to facilitate the use of resource-management statements 106-108 by providing one or more indicators in the programming language platform associated with the source code for software program 110 and enabling use of the type(s) with resource-management statements 106-108. The indicators may be associated with interfaces, abstract classes, annotations, modifiers, and/or naming conventions in the programming language platform.

In particular, SDK 102 and compilation manager 104 may provide a first indicator for a resource with a close method that does not complete erroneously (e.g., complete abruptly with a checked exception). Use of the first indicator with a resource-management statement may facilitate the omission of an exception-handling construct for the resource-management statement. SDK 102 and compilation manager 104 may also provide a second indicator for a resource with an idempotent close method. The second indicator may facilitate the use of a wrapped resource, such as the "FileReader" above, in the resource-management statement. Facilitating the use of resource-management statements 106-108 with the first and second indicators is discussed in further detail below with respect to FIG. 2.

Figure 2:
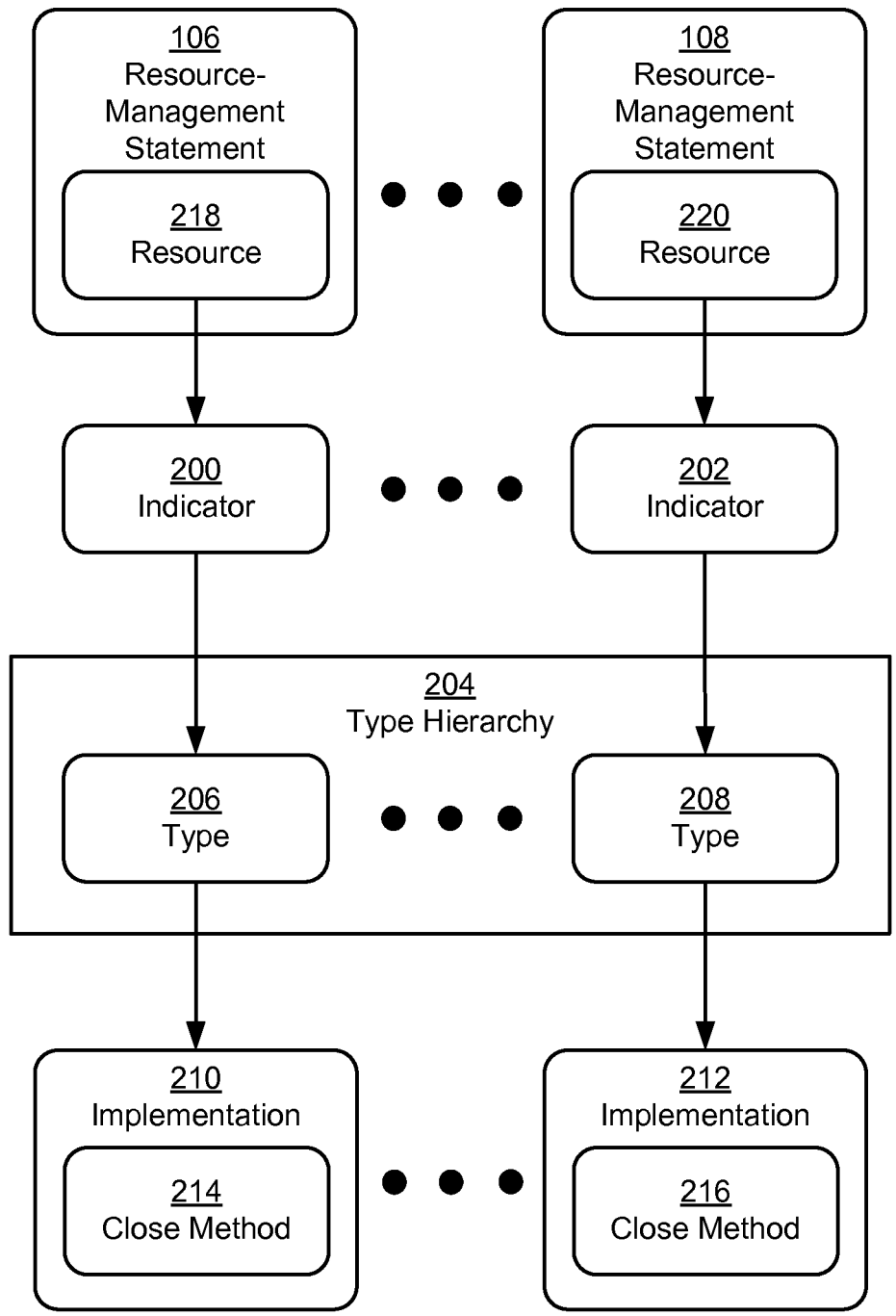
FIG. 2 shows the use of resource-management statements in a software program in accordance with the disclosed embodiments.

FIG. 2 shows the use of resource-management statements 106-108 in a software program (e.g., software program 110 of FIG. 1) in accordance with the disclosed embodiments. Resource-management statements 106-108 may be created using an SDK, such as SDK 102 of FIG. 1. In addition, each resource-management statement 106-108 may declare a resource 218-220 to be initialized and/or closed using the resource-management statement. For example, a resource-management statement may declare one or more file descriptors, formatters, sockets, input/output (I/O) channels, database connections, graphics contexts, and/or other resources using a "try" statement and one or more types (e.g., types 206-208) corresponding to the declared resource(s).

As mentioned above, resources 218-220 may be associated with one or more indicators 200-202 that facilitate the use of resource-management statements 106-108 in the software program. The first indicator may correspond to a resource with a close method that does not complete erroneously, and the second indicator may correspond to a resource with an idempotent close method. The first and second indicators may be provided in a programming language platform associated with source code for the software program. For example, the first and second indicators may be provided using interfaces, abstract classes, annotations, modifiers, and/or naming conventions in the programming language platform. The first and second indicators may also be included in a type hierarchy 204 of the programming language platform and/or in a set of types 206-208 in type hierarchy 204 based on the close methods (e.g., close methods 214-216) of types 206-208.

For example, the first indicator may be provided in a Java platform using the following source code:

```
package java.lang;
public interface SilentCloseable extends AutoCloseable {
    /**
     *No checked exceptions from close.
     */
    @Override
    void close( ); //no throws clause
}
```

In the source code, the first indicator corresponds to an interface named "SilentCloseable" in the "java.lang" package of the Java class library. The "SilentCloseable" interface also extends the "java.lang.AutoCloseable" interface, which allows implementations (e.g., implementations 210-212) of "SilentCloseable" to be used with Java resource-management statements (e.g., "try"-with-resources statements). Because the "close" method declaration within the "SilentCloseable" interface does not include a "throws" clause, an implementation of the "SilentCloseable" interface will not complete erroneously (e.g., by throwing checked exceptions). Finally, the "SilentCloseable" interface may be extended and/or implemented by a number of other Java platform types, including the following:

```
java.beans.XMLDecoder
java.beans.XMLEncoder
javax.sound.midi.MidiDevice
javax.sound.midi.Receiver
javax.sound.midi.Transmitter
javax.sound.sampled.Line
```

Similarly, the second indicator may be provided in a Java platform using the following source code:

```
package java.lang;
public interface IdempotentCloseable extends
    AutoCloseable {
    /**
     *Close must be idempotent.
     */
    @Override
    void close( ) throws Exception;
}
```

As shown in the source code, the second indicator also corresponds to an interface that extends the "java.lang.AutoCloseable" interface. Unlike the first indicator, the second indicator has a name of "IdempotentCloseable" and a "close" method declaration that "throws" a checked "Exception." The "close" method may also be required to be idempotent, in that multiple calls of the "close" method produce the same effect as a single call. Finally, the "IdempotentCloseable" interface may be added to the Java class library as a superinterface of the "java.io.Closeable" interface. In other words, all implementations and/or subinterfaces of the "java.io.Closeable" interface in the Java platform may also be configured as implementations and/or subinterfaces of the "IdempotentCloseable" interface.

Next, a compilation manager (e.g., compilation manager 104 of FIG. 1) may enable use of the first and second indicators with resource-management statements 106-108 by performing exception analysis on implementations 210-212 (e.g., classes) and/or close methods 214-216 of types 206-208 associated with indicators 200-202. For example, a Java compilation manager may use type hierarchy 204 to identify implementations 210-212 as Java classes that implement interfaces corresponding to the first indicator, the second indicator, and/or subinterfaces of the first and/or second indicators.

During the exception analysis, the compilation manager may examine each implementation (e.g., implementations 210-212) of a type (e.g., types 206-208) associated with the first indicator to determine if the close method (e.g., close methods 214-216) of the implementation can complete erroneously. If the exception analysis finds that the close method of the implementation does not complete erroneously, compilation of the implementation is permitted. Conversely, if the exception analysis finds that the close method of the implementation may throw a checked exception, a compilation error may be generated. The compilation manager may thus infer false positives (e.g., an erroneous completion is thought to occur but does not occur during runtime) in the software program but not false negatives (e.g., an erroneous completion occurs at runtime but is not inferred to occur prior to runtime).

In turn, the declaring of a resource (e.g., resources 218-220) associated with the first indicator in a resource-management statement (e.g., resource-management statements 106-108) may facilitate the omission of an exception-handling construct for the resource-management statement. More specifically, because the resource's close method (e.g., close methods 214-216) does not complete erroneously, the compilation manager may allow the resource-management statement (e.g., "try" block) to be written without an accompanying exception-handling construct (e.g., "catch" block). For example, use of the first indicator may facilitate the use of an anonymous inner class in a Java resource-management statement, as shown in the following source code:

```
try (SilentCloseable ac = new SilentCloseable( ) {
    public void close( ) {/* body of close */}
}) {
    ... // Use ac
}
```

In the source code, an anonymous inner class of type "SilentCloseable" (e.g., as shown above) is included in a "try"-with-resources block, thus allowing the "try"-with-resources block to be written without a subsequent "catch" block. On the other hand, if the "SilentCloseable" type is not included in the Java platform, the anonymous inner class may implement the "AutoCloseable" interface. Moreover, a "catch" block may be inserted after the "try"-with-resources block to avoid a compilation error associated with checked exceptions that may be thrown by the "AutoCloseable" anonymous inner class, even if the anonymous inner class's close method does not complete erroneously.

The compilation manager may also analyze implementations of types (e.g., types 206-208) associated with the second indicator to determine if the implementations' close methods (e.g., close methods 214-216) are idempotent close methods. For example, the compilation manager may ensure that each implementation's close method contains a Boolean field associated with closing of the resource. The Boolean field may initially be set to "false" (e.g., during initialization and use of the resource) and subsequently be set to "true" the first time the close method is called. In addition, if the Boolean field indicates that the resource has been closed (e.g., if the Boolean field is set to true), the close method may return without executing and ensure that multiple calls to the close method produce the same result as a single call to the close method. Conversely, if analysis of a close method's idempotence is outside the scope of the compilation manager's functionality, the compilation manager may accept all implementations of the second type as having idempotent close methods.

Moreover, the declaring of a resource associated with the second indicator in a resource-management statement may facilitate the use of a wrapped resource in the resource-management statement. As mentioned above, the close method of the wrapped resource may be called multiple times (e.g., when a call to the close method is cascaded from a wrapping resource and when the close method is called directly by the resource-management statement). By using the second indicator, the wrapped resource may specify to the compilation manager that multiple calls to the wrapped resource's close method do not constitute a hazardous situation. In turn, the compilation manager may permit use of the wrapped resource in the resource-management statement.

Finally, the compilation manager may manage the compilation of the software program by desugaring the software program based on the use of the first and second indicators with resource-management statements 106-108. For example, the compilation manager may omit the generation of an exception-handling construct for a resource-management statement if the resource-management statement is associated with the first indicator. Similarly, the compilation manager may generate a single call to a wrapped resource's close method if the resource is associated with the second indicator and multiple calls to the close method if the resource is not associated with the second indicator.

The first and second indicators may also facilitate other aspects of the development, compilation, and/or maintenance of the software program. More specifically, because the first and second indicators characterize the close methods of manually closed resources, a developer of the software program may create resource-management statements 106-108 containing the resources in a more straightforward manner. For example, the developer may omit an exception-handling construct that normally follows a resource-management statement if the resource-management statement declares a resource that implements the first type. The developer may also use a wrapped resource in a resource-management statement if the wrapped resource implements the second type. Finally, the developer may create resource-management statements that initialize and close sets of similar resources, such as resources with close methods that do not complete erroneously or resources with idempotent close methods.

Similarly, the first and second indicators may aid with the validation and/or debugging of the software program. For example, the first and second indicators may help debugging tools verify that resource-management statements in the software program are correctly written and/or identify hazards associated with wrapped resources in the resource-management statements.

Figure 3:
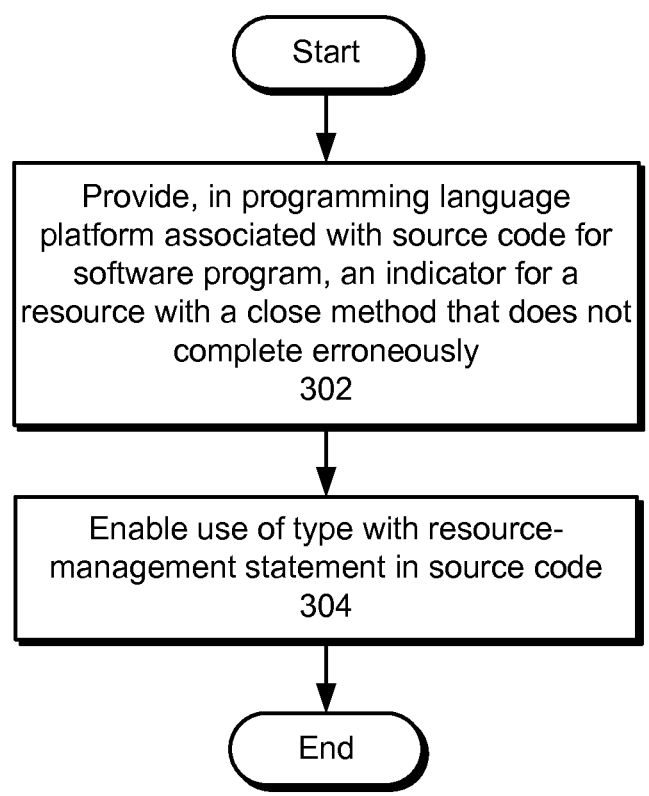
FIG. 3 shows a flowchart illustrating the process of facilitating the development and compilation of a software program in accordance with the disclosed embodiments.

FIG. 3 shows a flowchart illustrating the process of facilitating the development and compilation of a software program in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

First, an indicator for a resource with a close method that does not complete erroneously (e.g., complete abruptly with a checked exception) is provided in a programming language associated with source code for the software program (operation 302). The indicator may be included in a type hierarchy of the programming language platform and/or in a set of types in the type hierarchy based on the close methods of the types. For example, the indicator may correspond to an interface in the Java class library with a close method that does not include a "throws" clause. The interface may also be extended and/or implemented by interfaces and/or classes for resources with close methods that do not complete erroneously. The indicator may also correspond to an abstract class, an annotation, a modifier, and/or a naming convention. For example, the indicator may be specified using a Javadoc comment, a Java annotation, and/or a special symbol preceding the close method of the resource.

Next, use of the indicator with a resource-management statement in the source code is enabled (operation 304). For example, an implementation of a type associated with the indicator may be compiled only if the implementation's close method does not complete erroneously. In addition, use (e.g., declaration) of the indicator in the resource-management statement may allow an exception-handling construct (e.g., a "catch" block) following the resource-management statement (e.g., a "try" block) to be omitted.

Figure 4:
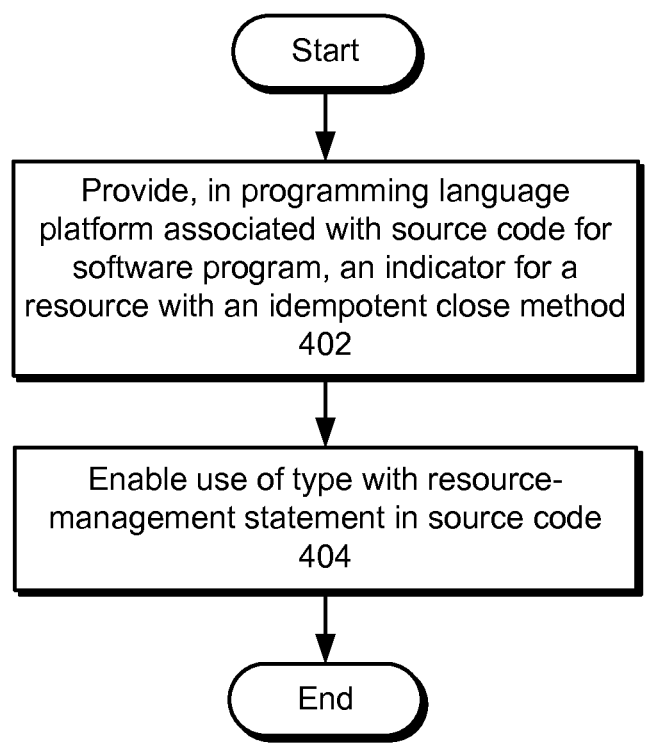
FIG. 4 shows a flowchart illustrating the process of facilitating the development and compilation of a software program in accordance with the disclosed embodiments.

FIG. 4 shows a flowchart illustrating the process of facilitating the development and compilation of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, an indicator for a resource with an idempotent close method is provided in a programming language associated with source code for the software program (operation 402). As with the indicator described in FIG. 3 (e.g., the first indicator), the indicator of FIG. 4 (e.g., second indicator) may be included in a type hierarchy of the programming language platform and/or in a set of types in the type hierarchy based on the close methods of the types. For example, the indicator may correspond to an interface in the Java class library with a close method that is defined as idempotent. The interface may be extended and/or implemented by interfaces and/or classes for resources with idempotent close methods, such as "java.io.Closeable" and/or implementations of "java.io.Closeable." Alternatively, the indicator may correspond to an abstract class, annotation, modifier, and/or naming convention associated with the programming language platform.

Next, use of the indicator with a resource-management statement in the source code is enabled (operation 404). For example, an implementation of a type associated with the indicator may be compiled only if the implementation's close method contains a Boolean field associated with closing of the resource. If the Boolean field indicates that the resource has been closed, the close method returns without executing. In addition, use of a wrapped resource in the resource-management statement may be permitted if the wrapped resource corresponds to an implementation of the type because multiple calls to the wrapped resource's close method do not constitute a hazardous situation.

Figure 5:
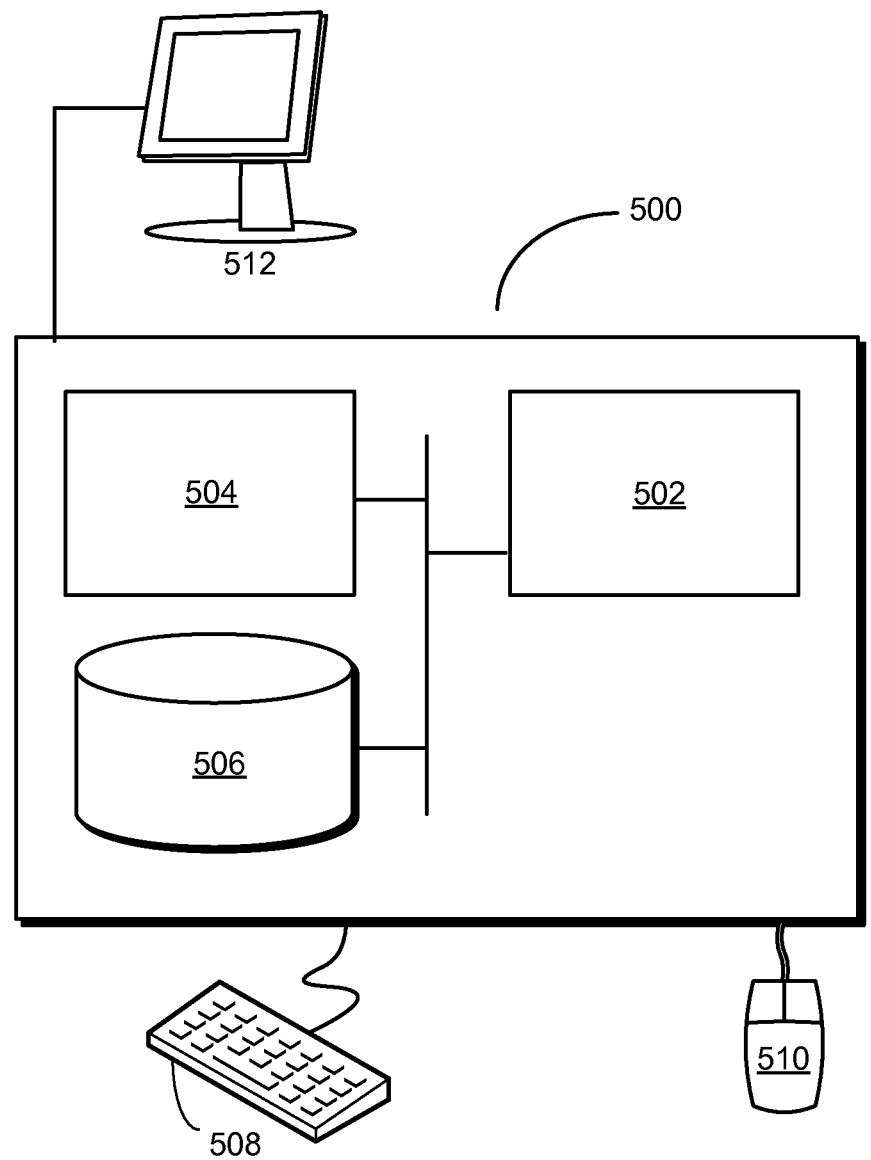
FIG. 5 shows a computer system in accordance with the disclosed embodiments.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the compilation of a software program. The system may include an SDK and a compilation manager. The SDK and compilation manager may provide, in a programming language platform associated with source code for the software program, a first indicator for a resource with a close method that does not complete erroneously and a second indicator for a resource with an idempotent close method. The first and second types may be included in a type hierarchy of the programming language platform and/or in a set of types in the type hierarchy based on the close methods of the types. The SDK and compilation manager may also enable use of the indicators with resource-management statements in the source code. The first type may facilitate omission of an exception-handling construct for a resource-management statement, and the second type may facilitate the use of a wrapped resource in a resource-management statement.

In addition, one or more components of computer system 500 may be remotely located and connected to the other components over a network. Portions of the present embodiments (e.g., SDK, compilation manager, etc.) may also be located on different nodes of a distributed system that implements the embodiments. For example, the present embodiments may be implemented using a cloud computing system that remotely manages the development, compilation, and maintenance of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method comprising:
detecting, by a compiler while compiling source code of a software program, a resource associated with an indicator, wherein the indicator indicates that the resource's close method is considered by the source code to be idempotent; and in response to the detection, analyzing an implementation of the resource's close method to ensure that the resource's close method is structured to function idempotently.

2. The method of claim 1, wherein the indicator is included in a type hierarchy of a programming language platform associated with the source code.

3. The method of claim 2, wherein the indicator is included in type declarations of a set of types in the type hierarchy based on a set of close methods of the types.

4. The method of claim 1, further comprising:
    if the analysis determines that the resource's close method is idempotent, permitting compilation of the implementation; and
    if the analysis determines that the resource's close method is not idempotent, generating a compilation error.

5. The method of claim 1, wherein the idempotent close method comprises a Boolean field associated with closing of the resource.

6. The method of claim 5, wherein if the Boolean field indicates that the resource has been closed, the idempotent close method returns without executing.

7. The method of claim 1, wherein the indicator is associated with at least one of an interface, an abstract class, an annotation, a modifier, and a naming convention.

8. The method of claim 1, wherein analyzing the implementation of the resource's close method comprises determining whether the resource comprises an internal structure tracking whether the resource has been closed.

9. A system comprising:
    a processor;
    memory;
    a compilation manager for a software program;
    wherein the compilation manager is stored in the memory, executed by the processor, and configured to:
        detect, while compiling source code of a software program, a resource associated with an indicator, wherein the indicator indicates that the resource's close method is considered by the source code to be idempotent; and
        in response to the detection, analyze an implementation of the resource's close method to ensure that the resource's close method is structured to function idempotently.

10. The system of claim 9, wherein the indicator is included in a type hierarchy of a programming language platform associated with the source code.

11. The system of claim 10, wherein the indicator is included in type declarations of a set of types in the type hierarchy based on a set of close methods of the types.

12. The system of claim 9, wherein the compilation manager is further configured to:
    if the analysis determines that the resource's close method is idempotent, permitting compilation of the implementation; and
    if the analysis determines that the resource's close method is not idempotent, generating a compilation error.

13. The system of claim 9, wherein the idempotent close method comprises a Boolean field associated with closing of the resource.

14. The system of claim 9, wherein the indicator is associated with at least one of an interface, an abstract class, an annotation, a modifier, and a naming convention.

15. The system of claim 13, wherein if the Boolean field indicates that the resource has been closed, the idempotent close method returns without executing.

16. The system of claim 9, wherein analyzing the implementation of the resource's close method comprises determining whether the resource comprises an internal structure tracking whether the resource has been closed.

17. One or more non-transitory computer-readable storage media storing instructions that when executed by a computer cause:
    detecting, by a compiler while compiling source code of a software program, a resource associated with an indicator, wherein the indicator indicates that the resource's close method is considered by the source code to be idempotent; and
    in response to the detection, analyzing an implementation of the resource's close method to ensure that the resource's close method is structured to function idempotently.

18. The non-transitory computer-readable storage media of claim 17, wherein the indicator is included in a type hierarchy of a programming language platform associated with the source code.

19. The one or more non-transitory computer-readable storage media of claim 18, wherein the indicator is included in a set of types in the type hierarchy based on a set of close methods of the types.

20. The one or more non-transitory computer-readable storage media of claim 17, further comprising:
    if the analysis determines that the resource's close method is idempotent, permitting compilation of the implementation; and
    if the analysis determines that the resource's close method is not idempotent, generating a compilation error.

21. The one or more non-transitory computer-readable storage media of claim 17, wherein the idempotent close method comprises a Boolean field associated with closing of the resource.

22. The one or more non-transitory computer-readable storage media of claim 21, wherein if the Boolean field indicates that the resource has been closed, the idempotent close method returns without executing.

23. The one or more non-transitory computer-readable storage media of claim 17, wherein analyzing the implementation of the resource's close method comprises determining whether the resource comprises an internal structure tracking whether the resource has been closed.

* * * * *